(12) United States Patent
Shin et al.

(10) Patent No.: US 11,500,432 B2
(45) Date of Patent: Nov. 15, 2022

(54) DISPLAY DEVICE

(71) Applicant: Samsung Display Co., Ltd., Yongin-Si (KR)

(72) Inventors: Dong Hee Shin, Asan-si (KR); Yoo Mi Ra, Ansan-si (KR); Yong Hee Lee, Suwon-si (KR)

(73) Assignee: Samsung Display Co., Ltd.

( * ) Notice: Subject to any disclaimer, the term of this patent is extended or adjusted under 35 U.S.C. 154(b) by 331 days.

(21) Appl. No.: 16/809,494

(22) Filed: Mar. 4, 2020

(65) Prior Publication Data

US 2021/0011530 A1   Jan. 14, 2021

(30) Foreign Application Priority Data

Jul. 11, 2019   (KR) .................. 10-2019-0083841

(51) Int. Cl.
| | |
|---|---|
| *G09G 5/00* | (2006.01) |
| *G06F 1/18* | (2006.01) |
| *G09F 9/30* | (2006.01) |
| *G06F 1/16* | (2006.01) |

(52) U.S. Cl.
CPC ............ *G06F 1/189* (2013.01); *G06F 1/1652* (2013.01); *G09F 9/301* (2013.01)

(58) Field of Classification Search
CPC .... G06F 1/1601; G06F 1/1637; G06F 1/1652; G06F 1/189; G06F 2200/1612; G09F 9/301; G02F 1/13452; G02F 1/13458; H01L 27/3276; H01L 51/5253; H05K 1/147; H05K 2201/05
See application file for complete search history.

(56) References Cited

U.S. PATENT DOCUMENTS

| | | | | |
|---|---|---|---|---|
| 6,888,606 | B2* | 5/2005 | Hinata | G02F 1/1339 |
| | | | | 349/149 |
| 10,254,578 | B2* | 4/2019 | Shin | G02F 1/133514 |
| 10,692,899 | B2* | 6/2020 | Shin | G02F 1/1339 |
| 10,983,404 | B2* | 4/2021 | Shin | G02F 1/136286 |
| 10,997,939 | B2* | 5/2021 | Shin | G09G 3/3275 |
| 2007/0030409 | A1* | 2/2007 | Aoki | G02F 1/1345 |
| | | | | 349/56 |
| 2010/0002180 | A1* | 1/2010 | Kim | G02F 1/13458 |
| | | | | 349/190 |
| 2014/0160695 | A1* | 6/2014 | Jeong | G02F 1/13452 |
| | | | | 438/26 |

(Continued)

FOREIGN PATENT DOCUMENTS

| | | |
|---|---|---|
| KR | 10-2000-0066397 A | 11/2000 |
| KR | 10-2003-0080851 A | 10/2003 |

(Continued)

*Primary Examiner* — Joe H Cheng
(74) *Attorney, Agent, or Firm* — Innovation Counsel LLP

(57) ABSTRACT

A display device according to an exemplary embodiment includes: a display panel; and a flexible printed circuit board that is connected to the display panel, wherein the display panel includes: a substrate that includes a display area including a plurality of pixels, and a non-display area which is a remaining area of the substrate; an insulation pattern that is disposed along one edge of the display panel and overlaps the flexible printed circuit board; and a data pad that is disposed between the display area and the insulation pattern.

18 Claims, 13 Drawing Sheets

(56) References Cited

U.S. PATENT DOCUMENTS

| | | | | |
|---|---|---|---|---|
| 2014/0355227 | A1* | 12/2014 | Lim | G02F 1/133305 |
| | | | | 361/749 |
| 2015/0230331 | A1* | 8/2015 | Lee | H05K 1/0259 |
| | | | | 361/220 |
| 2015/0255739 | A1* | 9/2015 | Kim | H01L 27/3276 |
| | | | | 428/192 |
| 2017/0013722 | A1* | 1/2017 | Kim | H01L 24/27 |
| 2017/0338294 | A1* | 11/2017 | Choi | H01L 27/3276 |
| 2019/0348487 | A1* | 11/2019 | Kim | H01L 24/81 |
| 2020/0194516 | A1* | 6/2020 | Kim | H04M 1/0266 |
| 2020/0235189 | A1* | 7/2020 | Bae | H05K 1/147 |

FOREIGN PATENT DOCUMENTS

| | | |
|---|---|---|
| KR | 10-2013-0024097 A | 3/2013 |
| KR | 10-2014-0080240 A | 6/2014 |
| KR | 10-2017-0063306 A | 6/2017 |

* cited by examiner

DISPLAY DEVICE

CROSS-REFERENCE TO RELATED APPLICATION

This application claims priority to and the benefit of Korean Patent Application No. 10-2019-0083841 filed in the Korean Intellectual Property Office on Jul. 11, 2019, the entire contents of which are incorporated herein by reference.

BACKGROUND

(a) Field

The present disclosure relates to a display device.

(b) Description of the Related Art

In recent years, the use of display devices such as an organic light emitting diode (OLED) display and a liquid crystal display (LCD) have been widespread. In general, a display device includes a driver and a plurality of pixels, which are units for displaying an image. The driver includes a data driver applying a data voltage to a pixel, and a gate driver applying a gate signal for controlling transfer of the data voltage.

Recently, there has been a growing demand for a display device having a small dead space located around an area where an image of a display panel is displayed. As the size of the dead space increases, the area displaying the image may appear relatively small.

The above information disclosed in this Background section is only for enhancement of understanding of the background of the invention and therefore it may contain information that does not form the prior art that is already known in this country to a person of ordinary skill in the art.

SUMMARY

Exemplary embodiments have been made in an effort to prevent permeation of moisture, chemicals, and the like into a display panel, and prevent wire breakage due to physical impact that may be applied to the end of the display panel.

In addition, exemplary embodiments are provided to support the flexible printed circuit board by increasing a step difference at the end of the display panel, and prevent pressing or bending of the flexible printed circuit board by the empty space between the display panel and the flexible printed circuit board.

Further, exemplary embodiments are provided to provide the dead space of the display device can be reduced to maximize the area where the image is displayed.

A display device according to an exemplary embodiment includes: a display panel; and a flexible printed circuit board that is connected to the display panel, wherein the display panel includes: a substrate that includes a display area including a plurality of pixels, and a non-display area which is a remaining area of the substrate; an insulation pattern that is disposed along one edge of the display panel and overlaps the flexible printed circuit board; and a data pad that is disposed between the display area and the insulation pattern.

The insulation pattern may include an organic material.

The display panel may include: a first conductive layer that is disposed on the substrate; and a first insulation layer that is disposed on the first conductive layer.

The insulation pattern may be disposed on the first insulation layer.

The display panel may further include a data line configured to transmit a data voltage in the display area, the first conductive layer may include a data connection wire connected with the data line, a first electrode, and an extension wire, the first insulation layer may include an opening exposing the first electrode, and the data pad may include a second electrode that is disposed in the opening of the first electrode and the first electrode such that it contacts the first electrode, while overlapping the same.

The display device according to the exemplary embodiment may further include comprising a test wire that overlaps the insulation pattern.

The data pad may be arranged in two rows.

The flexible printed circuit board may include a data driver integrated circuit and a data input pad connected with the data driver integrated circuit.

The display device according to the exemplary embodiment may further include an anisotropically conductive layer that electrically connects the data input pad and the data pad of the display panel while bonding the data input pad and the data pad of the display panel to each other.

The flexible printed circuit board may include a first flexible printed circuit board and a second flexible printed circuit board that overlap each other, the first flexible printed circuit board may include a first data driver integrated circuit and a first data input pad connected with the first data driver integrated circuit, the second flexible printed circuit board may include a second data driver integrated circuit and a second data input pad connected with the second data driver integrated circuit, and the first data input pad may be connected with data pads in the first row of the data pads in the display panel and the second data input pad may be connected with data pads in the second row of the data pads in the display panel.

The insulation pattern may be disposed below the first insulation layer.

The insulation pattern may include a first insulation pattern and a second insulation pattern that overlap each other, while disposing the first insulation layer therebetween.

The first insulation pattern and the second insulation pattern may include different materials.

The substrate may include a first edge and a second edge that face each other, and the insulation pattern may extend to the second edge from the first edge.

A display device according to an exemplary embodiment includes: a substrate that includes a display area including a plurality of pixels and a non-display area which is a remaining area of a substrate; an insulation pattern that is disposed in the non-display area; a data pad that is disposed between the display area and the insulation pattern; and an extension wire that is connected to the data pad and extends to one edge of the substrate, and the insulation pattern overlaps the extension wire.

The insulation pattern comprises an organic material.

The display device according to the exemplary embodiment may further include: a first conductive layer that is disposed on the substrate; and a first insulation layer that is disposed on the first conductive layer.

The insulation pattern may be disposed on the first insulation layer.

The insulation pattern may be disposed below the first insulation layer.

The insulation pattern may include a first insulation pattern and a second insulation pattern that overlap each other, while disposing the first insulation layer therebetween.

According to the exemplary embodiments, it is possible to prevent moisture, chemicals, and the like from penetrating the display panel and to prevent wire breakage due to physical impact that may be applied to the end of the display panel.

In addition, it is possible to support the flexible printed circuit board by increasing a step difference at the end of the display panel, and it is possible to prevent pressing or bending of the flexible printed circuit board by the empty space between the display panel and the flexible printed circuit board.

In addition, the dead space of the display device can be reduced to maximize the area where the image is displayed.

DETAILED DESCRIPTION OF THE EMBODIMENTS

Figure 1:
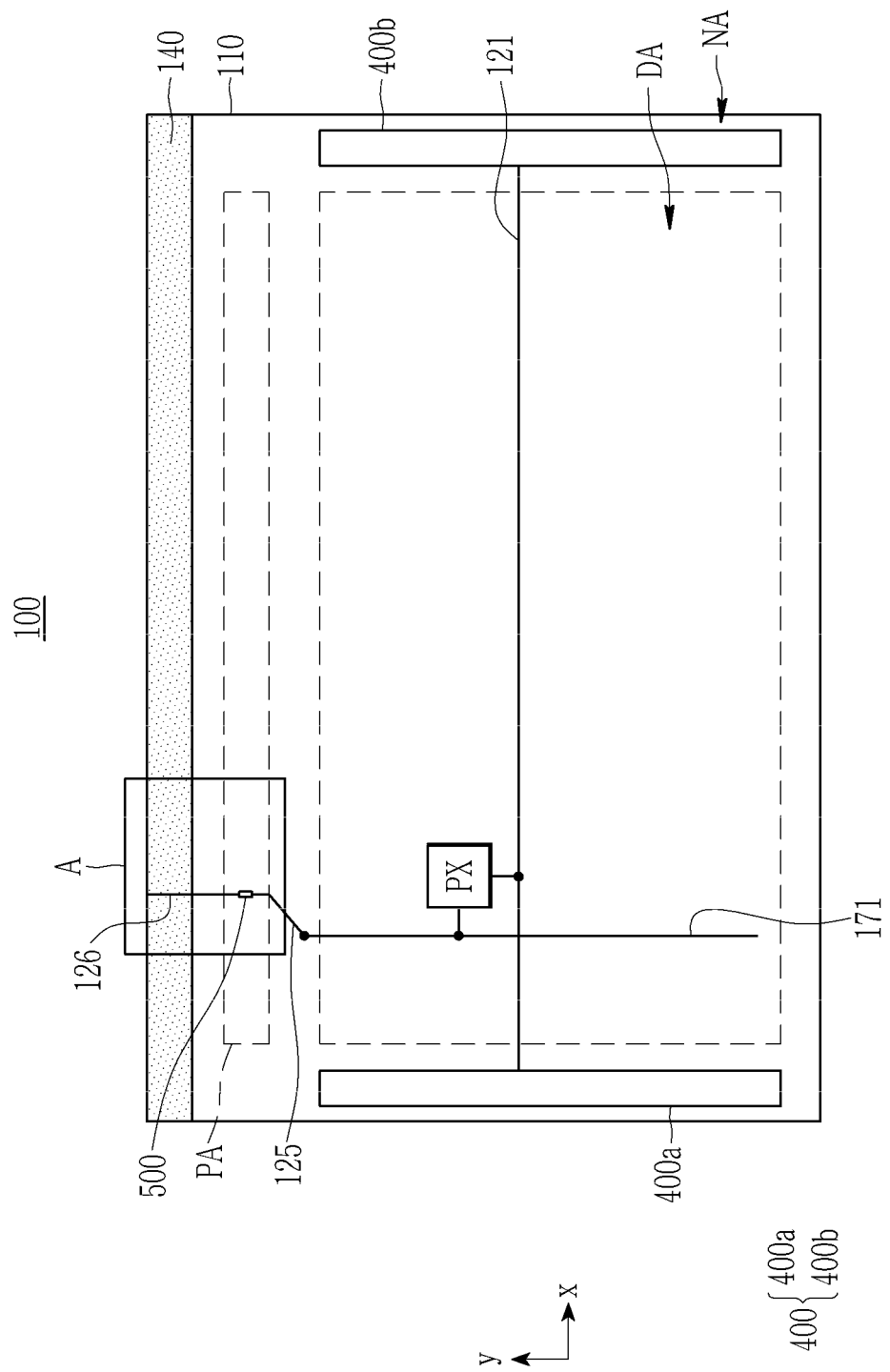
FIG. 1 is a top plan view of a display device according to an exemplary embodiment.

The present inventive concept will be described more fully hereinafter with reference to the accompanying drawings, in which exemplary embodiments of the invention are shown. As those skilled in the art would realize, the described embodiments may be modified in various different ways, all without departing from the spirit or scope of the present inventive concept.

The drawings and description are to be regarded as illustrative in nature and not restrictive. Like reference numerals designate like elements throughout the specification.

In addition, the size and thickness of each configuration shown in the drawings are arbitrarily shown for understanding and ease of description, but the present inventive concept is not limited thereto. In the drawings, the thickness of layers, films, panels, regions, etc., are exaggerated for clarity. In the drawings, for understanding and ease of description, the thickness of some layers and areas is exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" a target element will be understood to represent being positioned above or below the target element, and will not necessarily be understood to be positioned "at an upper side" based on a direction opposite to gravity.

In addition, unless explicitly described to the contrary, the word "comprise" and variations such as "comprises" or "comprising" will be understood to imply the inclusion of stated elements but not the exclusion of any other elements.

In addition, in this specification, the phrase "on a plane" means viewing a target portion from the top, and the phrase "on a cross-section" means viewing a cross-section formed by vertically cutting a target portion from the side.

Figure 2:
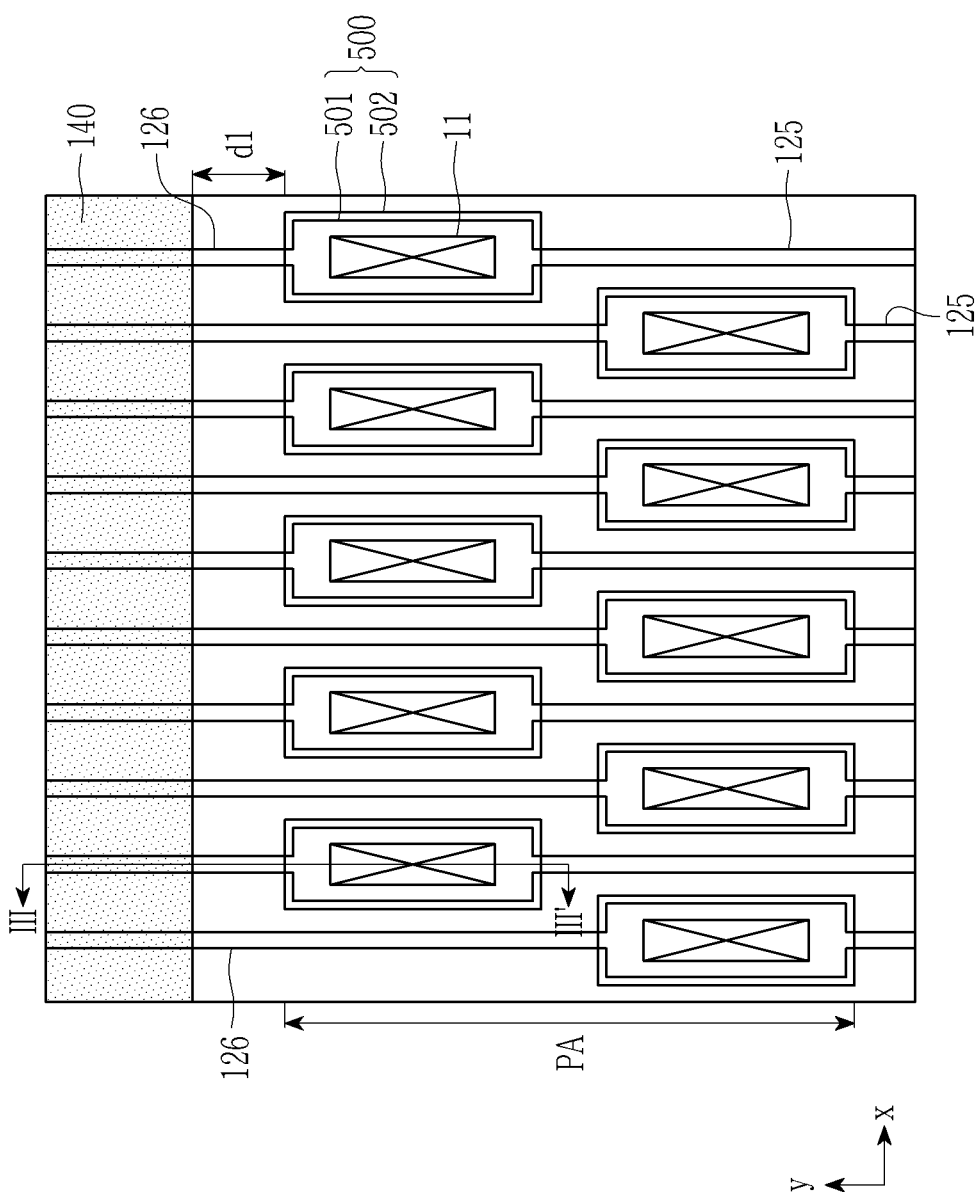
FIG. 2 is an enlarged view of the area A of FIG. 1.
Figure 3:
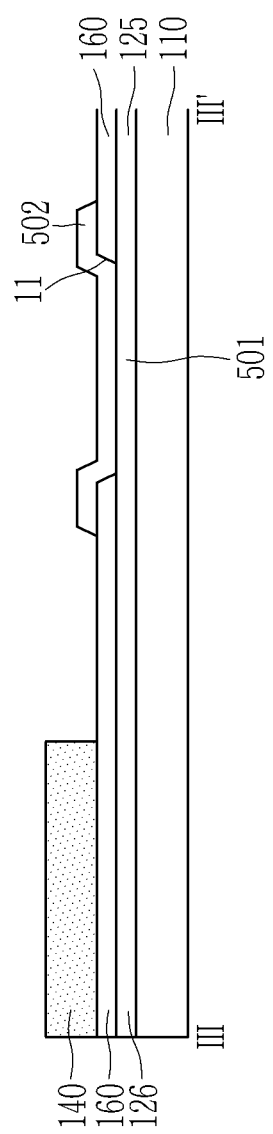
FIG. 3 is a cross-sectional view of FIG. 2, taken along the line III-III'.

First, a display device according to an exemplary embodiment will be described with reference to FIG. 1 to FIG. 3. FIG. 1 is a top plan view of a display device according to an exemplary embodiment. FIG. 2 is an enlarged view of the area A of FIG. 1, and FIG. 3 is a cross-sectional view of FIG. 2, taken along the line III-III'.

Referring to FIG. 1, a display panel 100 includes a display area DA where an image is displayed, and a non-display area NA which is the remaining area. In the display area DA, a plurality of gate lines 121, a plurality of data lines 171, and a plurality of pixels PX connected with the plurality of gate lines 121 and the plurality of data lines 171 are located.

The gate line 121 transmits a gate signal, and extends substantially in a first direction x. The data line 171 transmits a data voltage corresponding to a video signal, and extends substantially in a second direction y, which crosses the first direction x. Each pixel PX may include at least one switch (not shown) electrically connected with the gate line 121 and the data line 171, and at least one pixel electrode (not shown) connected to the at least one switch. The switch is an electrical element such as a thin film transistor integrated in the display panel 100, and may include a gate terminal, an input terminal, and an output terminal. The switch is turned on or off according to the gate signal of the gate line 121 to selectively transmit the data voltage from data line 171 to the pixel electrode. According to the data voltage applied to the pixel electrode, the pixels PX may display corresponding images.

The non-display area NA may surround the display area DA or be located at an edge of the display panel 100. In the non-display area NA, a gate driver 400, a pad part PA, and an insulation pattern 140 are located. In addition, in the non-display area NA, the gate line 121 and the data line 171 of the display area DA may be extended from the display area DA. In the non-display area NA, a data connection wire 125 connecting the data line 171 and a data pad 500 of the pad part PA may be located, and an extension wire 126 that extends from the data pad 500 to one edge of the display panel 100 may be located.

The gate driver 400 may include a first gate driver 400a and a second gate driver 400b positioned at respective sides of the non-display area NA with reference to the display area DA. That is, the planar display area DA may be located between the first gate driver 400a and the second gate driver 400b.

The first gate driver 400a may include a plurality of first stages (not shown) arranged in one line along the second direction y at the left area of the display panel 100, and the second gate driver 400b may include a plurality of second stages (not shown) arranged in one line along the second direction y at the right area of the display panel 100. The corresponding stages of the first gate driver 400a and the second gate driver 400b may be connected with the same gate line 121 and thus may apply a gate signal. As such, when the gate signal is applied to the gate line 121 at both sides of the display panel 100, even if the display panel 100 is enlarged, display defects due to the delay of the gate signal can be prevented.

The gate driver 400 includes the first gate driver 400a and the second gate driver 400b, but the gate driver 400 may be disposed at only one side of the display panel 100 rather than being disposed at both sides of the display panel 100.

A pad portion PA including a plurality of data pads 500 is disposed at one edge of the non-display area NA of the display panel 100. The data pads 500 of the pad portion PA are connected with the data connection wire 125, and the data connection wire 125 is connected to the data line 171 of the display area DA. In addition, the pad portion PA may include a pad connected with a control signal line (not shown) that transmits a clock signal and the like to the gate driver 400.

The insulation pattern 140 is disposed at one edge of the display panel 100, and may extend in the first direction x. The insulation pattern 140 is disposed at one edge of the non-display area NA of the display panel 100, adjacent to the pad portion PA, and may be disposed apart from the pad portion PA. That is, the pad portion PA may be disposed between the insulation pattern 140 and the display area DA in the non-display area NA, and the insulation pattern 140 may be disposed at a distance from the pad portion PA and the data pads 500. In addition, the insulation pattern 140 may extend from one end of the display panel 100 to the other end thereof with reference to the first direction x. That is, the display panel 100 includes a first edge and a second edge that face each other, and the insulation pattern 140 may extend to the second edge from the first edge. The display panel 100 may also include a third edge and a fourth edge each perpendicular to the first edge and the second edge, and the insulation pattern 140 may overlap the entire third edge, and may not overlap the fourth edge facing the third edge. The insulation pattern 140 may include an organic material.

Referring to FIG. 2 and FIG. 3, gate conductive layers (hereinafter also referred to as a first conductive layer) and a data pad 500 are disposed on a substrate 110. The gate conductive layers include an extension wire 126, a first electrode 501, and a data connection wire 125. The data pad 500 includes a first electrode 501 and a second electrode 502.

The extension wire 126 extends in the second direction y from one end of the display panel 100. The extension wire 126 may be connected with a test wire of the display panel 100 before the test wire is cut.

The first electrode 501 extends from the extension wire 126 and protrudes to opposite sides with reference to the first direction x. The data connection wire 125 extends substantially in the second direction y from the first electrode 501. One end of the data connection wire 125 is connected with the first electrode 501, and the other end thereof may be connected with the data line 171 of the display area DA.

The gate conductive layers may include aluminum-based metals such as aluminum (Al) or an aluminum alloy, silver-based metals such as silver (Ag) or a silver alloy, copper-based metals such as copper (Cu) or a copper alloy, molybdenum-based metals such as molybdenum (Mo) or a molybdenum alloy, chromium (Cr), tantalum (Ta), titanium (Ti), and the like. However, the gate conductive layers may have a multilayer structure including at least two conductive layers having different physical properties.

A first insulation layer 160 is disposed on the gate conductive layers. The first insulation layer 160 includes an opening 11 that exposes the first electrode 501. The first insulation layer 160 may include an organic insulator or an inorganic insulation layer. The organic insulator may include general purpose polymers (PMMA, PS), polymer derivatives with phenol groups, acryl-based polymers, imide polymers, arylether polymers, amide polymers, fluorine polymers, p-xylene polymers, vinyl alcohol polymers, and blends thereof. The inorganic insulation layer may include $SiO_2$, $SiN_x$, SiON, $Al_2O_3$, $TiO_2$, $Ta_2O_5$, $HfO_2$, $ZrO_2$, BST, PZT, and the like.

The second electrode 502 and the insulation pattern 140 are disposed on the gate conductive layers and the first insulation layer 160. The first electrode 501 and the second electrode 502 form the data pad 500. The second electrode 502 contacts the first electrode 501 in the opening 11 of the first insulation layer 160, while overlapping the first electrode 501 and the first insulation layer 160. Thus, the first electrode 501 may be connected with a flexible printed circuit board 300 through the second electrode 502 without exposing the gate conductive layers.

Depending on exemplary embodiments, a data conductive layer (hereinafter also referred to as a second conductive layer) and a second insulation layer may be further included on the first insulation layer 160. In this case, the data conductive layer 171 may include the data line 171 of FIG. 1, and the data conductive layer and the second insulation layer may also be disposed in the non-display area NA.

The data pad 500 is disposed in two rows, but the layout of the data pads 500 is not limited thereto. That is, the data pad 500 may be located on one row or three or more rows.

The insulation pattern 140 is disposed at one edge of the display panel 100, and corners of the insulation pattern 140 may match corners of the substrate 110. The insulation pattern 140 overlaps the extension wire 126. A shortest distance dl between the insulation pattern 140 and the data pad 500 may be 5 μm to 100 μm. However, the shortest distance dl between the insulation pattern 140 and the data pad 500 is not limited thereto. A display device according to an exemplary embodiment includes an insulation pattern 140 at one end of a display panel 100 to prevent permeation of moisture, chemicals, and the like into the display panel 100, and prevent a disconnection of wires due to a physical impact which may be applied to the end portion of the display panel 100.

Figure 4:
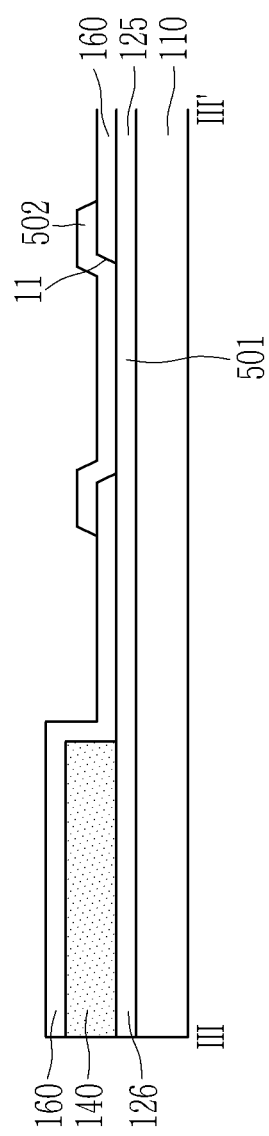
FIG. 4 is a cross-sectional view of FIG. 2, taken along the line III-III' in a display device according to an exemplary embodiment.

Hereinafter, a display device according to an exemplary embodiment will be described with reference to FIG. 4. FIG. 4 is a cross-sectional view of a display device according to an exemplary embodiment, taken along the line III-III' of FIG. 2. The display device of FIG. 4 is the same as the display device of FIG. 1 to FIG. 3, except for a position of an insulation pattern 140, and therefore no duplicated description will be provided.

Referring to FIG. 4, an insulation pattern 140 may be disposed below a first insulation layer 160. In addition, the insulation pattern 140 may be disposed between an extension wire 126 and the first insulation layer 160 in a cross-sectional view. That is, the insulation pattern 140 is disposed at one edge of the display panel 100, and may overlap the extension wire 126. The insulation pattern 140 may include an organic material.

Figure 5:
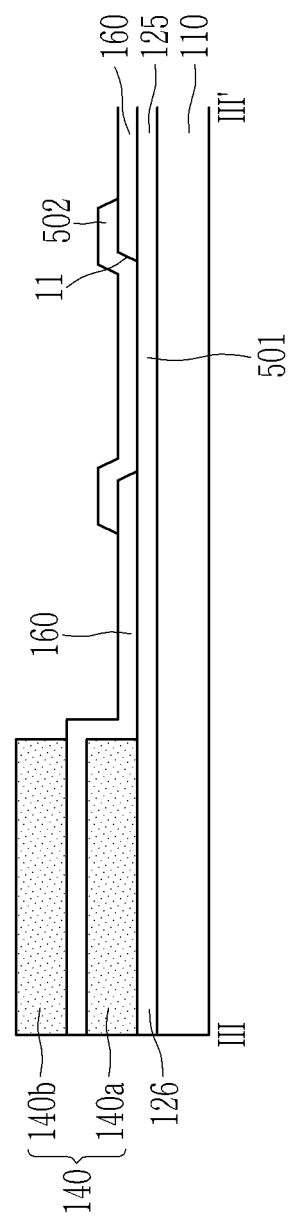
FIG. 5 is a cross-sectional view of FIG. 2, taken along the line III-III' in a display device according to an exemplary embodiment.

Hereinafter, a display device according to an exemplary embodiment will be described with reference to FIG. 5. FIG. 5 is a cross-sectional view of a display device according to an exemplary embodiment, taken along the line III-III' of FIG. 2. A display device of FIG. 5 is the same as the display device of FIG. 1 to FIG. 3, except for a position of an insulation pattern 140, and therefore a duplicated description will be omitted.

Referring to FIG. 5, an insulation pattern 140 includes a first insulation pattern 140a and a second insulation pattern 140b. The first insulation pattern 140a is disposed on an extension wire 126, a first insulation layer 160 is disposed on the first insulation pattern 140a, and the second insulation pattern 140b is disposed on the first insulation layer 160. The first insulation pattern 140a and the second insulation pattern 140b overlap each other, and also overlap the extension wire 126. That is, the first insulation pattern 140a and the second insulation pattern 140b may overlap each other, while disposing the first insulation layer 160 therebetween. The first insulation pattern 140a and the second insulation pattern 140b may include different materials.

Figure 6:
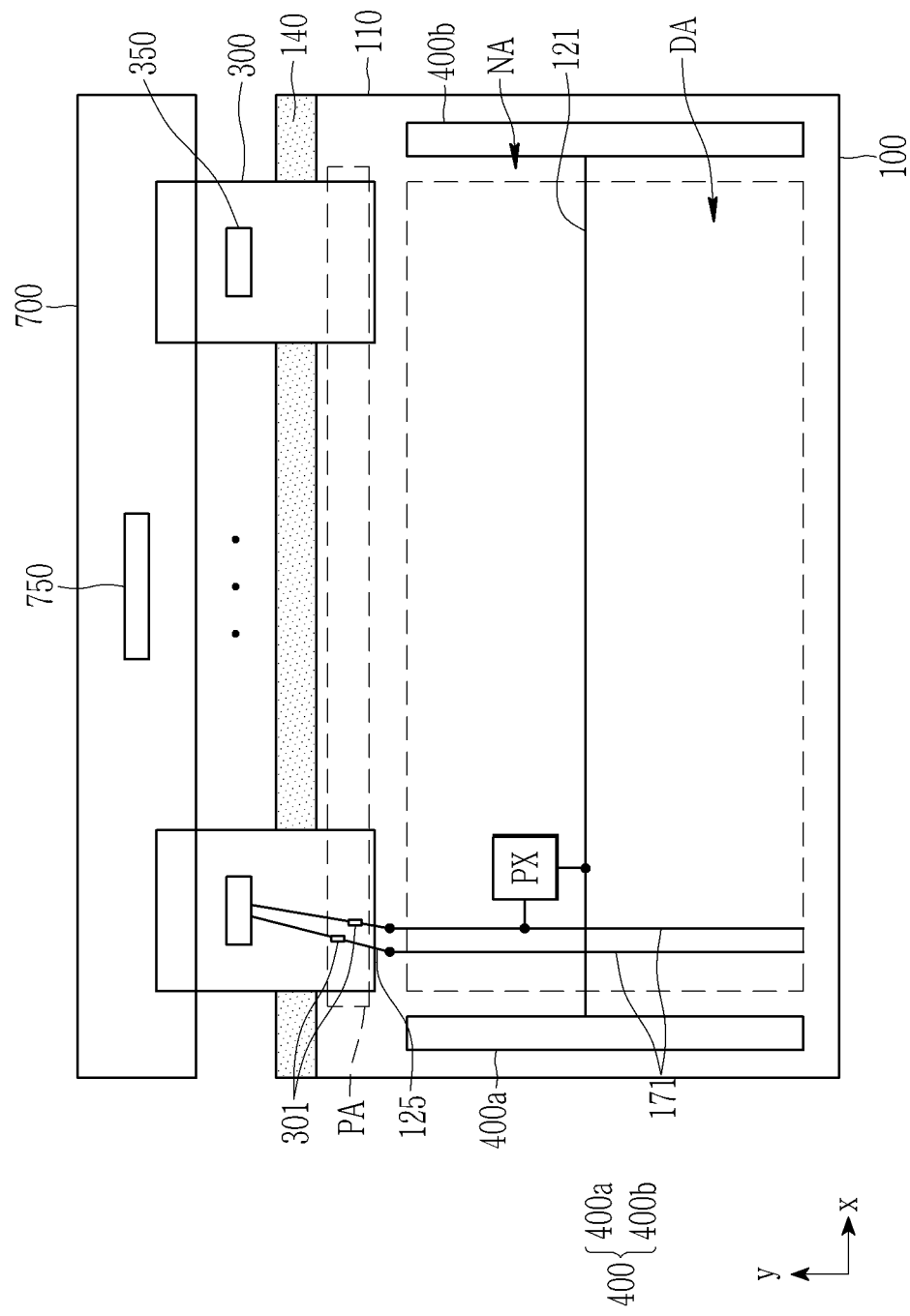
FIG. 6 is a top plan view of a display device according to an exemplary embodiment.
Figure 7:
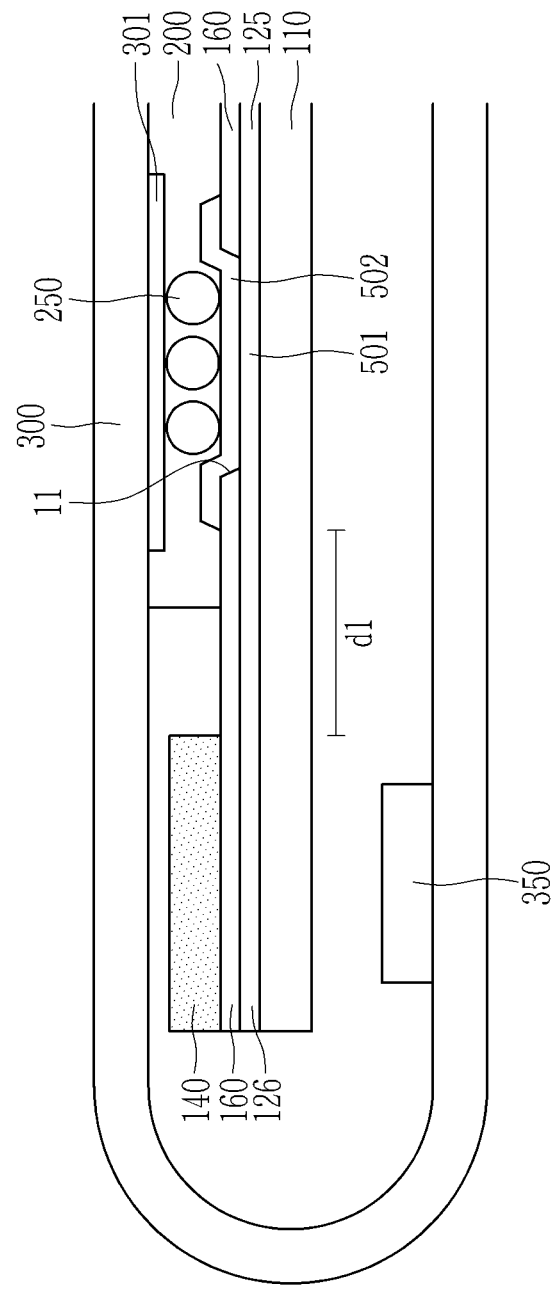
FIG. 7 is a cross-sectional view of a display device according to an exemplary embodiment.

Hereinafter, a display device according to an exemplary embodiment will be described with reference to FIG. 6 and FIG. 7. FIG. 6 is a top plan view of a display device according to an exemplary embodiment. FIG. 7 is a cross-sectional view of the display device according to the exemplary embodiment. Specifically, FIG. 7 is a cross-sectional view that shows a flexible printed circuit board of FIG. 6 in a bent state. The display device 100 of FIG. 6 is similar to the display panel 100 of FIG. 1, and thus no duplicated description will be provided.

Referring to FIG. 6, a display device according to an exemplary embodiment includes a display panel 100, a flexible printed circuit board 300, and a flexible printed circuit (FPC). The display panel 100 may be a display panel 100 included in various display devices such as a liquid crystal display (LCD), an organic light emitting diode (OLED) display, and the like.

The display panel 100 includes a display area DA where an image is displayed, and a non-display area NA which is the remaining area. A pad portion PA where data pads are located, and an insulation pattern 140, are disposed in the non-display area NA of the display panel 100.

The flexible printed circuit board 300 may be bendable, and one end of the flexible printed circuit board 300 is connected with the display panel 100. The flexible printed circuit board 300 includes a data driving integrated circuit 350 that generates a data voltage, which is a gray voltage corresponding to an input video signal, and a data input pad 301 connected with the data driving integrated circuit 350 through a wire. The data input pad 301 is connected with the data pad disposed in the pad portion PA of the display panel 100, and transmits a data voltage to a data connection wire 125 and a data line 171.

A printed circuit board 700 is connected with the other end of the flexible printed circuit board 300. The printed circuit FPC 700 includes a signal controller 750 that controls the data driver IC 350 and a gate driver 400. The signal controller 750 receives an input video signal and an input control signal that controls displaying of the input video signal, from an external graphic controller (not shown). The signal controller 750 is disposed in the printed circuit board 700, and may transmit a signal to the display panel 100 through the flexible printed circuit board 300.

Referring to FIG. 7, an anisotropically conductive layer 200 is disposed between the data pad 500 (including the first electrode 501 and the second electrode 502) of the display panel display panel 100 and the data input pad 301 of the flexible printed circuit board 300. The anisotropically conductive layer 200 may bond the data pad of the display panel 100 and the data input pad 301 of the flexible printed circuit board 300 to each other. The data pad of the display panel 100 and the data input pad 301 of the flexible printed circuit board 300 may be electrically connected with each other by the conductive balls 250 of the anisotropically conductive layer 200.

The flexible printed circuit board 300 may be bent in a bottom direction of the display panel 100. In FIG. 7, the data driver IC 350 is disposed in a plane of the flexible printed circuit board 300, adjacent to the display panel 100, but the position of the data driver IC 350 is not restrictive.

The display panel 100 includes the insulation pattern 140 disposed on the first insulation layer 160.

In a comparative example in which a solder resist is included at an end of a flexible printed circuit board, a design margin of a certain level or more is required to prevent the solder resist of the flexible printed circuit board from overlapping a pad portion of a display panel. However, in the display device according to the exemplary embodiment, the insulation pattern 140 is included in the display panel 100 so that the design margin can be reduced compared to the comparative example, and a dead space of the display device can be minimized. For example, the shortest distance d1 between the insulation pattern 140 and the second electrode 502 of the data pad may be 5 μm to 100 μm.

The insulation pattern 140 is disposed between the flexible printed circuit board 300 and the display panel 100 such that a defect of the display device due to a short circuit between the flexible printed circuit board 300 and the display panel 100 can be prevented. In addition, the insulation pattern 140 may support the flexible printed circuit board 300 by increasing a step difference of an end of the display panel 100, and may prevent the flexible printed circuit board 300 from being pressed or being bent due to an empty space between the display panel 100 and the flexible printed circuit board 300. In addition, the insulation pattern 140 can protect an edge of the display panel 100 by including an organic material, and may prevent permeation of moisture and the like into the display panel 100.

In FIG. 7, the insulation pattern 140 is distanced from the flexible printed circuit board 300, but the insulation pattern 140 may contact the flexible printed circuit board 300.

Figure 8:
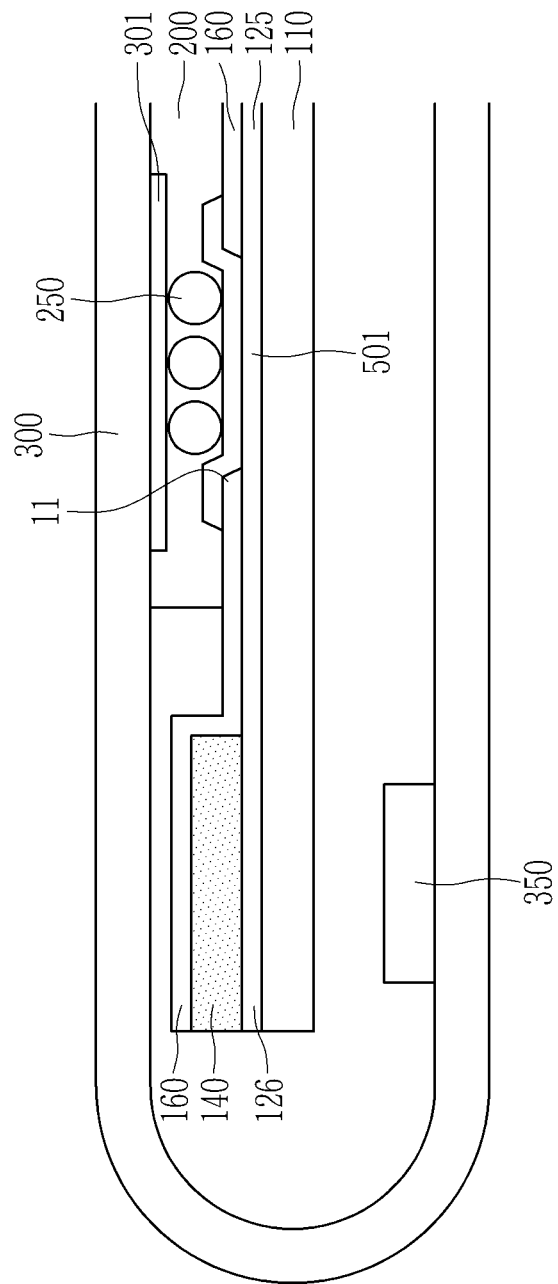
FIG. 8 is a cross-sectional view of a display device according to an exemplary embodiment.

Referring to FIG. 8, a display device according to an exemplary embodiment will now be described. FIG. 8 is a cross-sectional view of a display device according to an exemplary embodiment. Specifically, FIG. 8 is a cross-sectional view that shows a flexible printed circuit board 300 of a display device according to an exemplary embodiment that is in a bent state.

Referring to FIG. 8, a display device includes a display panel 100, a flexible printed circuit board 300, and an anisotropically conductive layer 200 that connects the display panel 100 and the flexible printed circuit board 300. The display panel 100 of the display device according to the exemplary embodiment includes an insulation pattern 140 disposed between an extension wire 126 and a first insulation layer 160.

Figure 9:
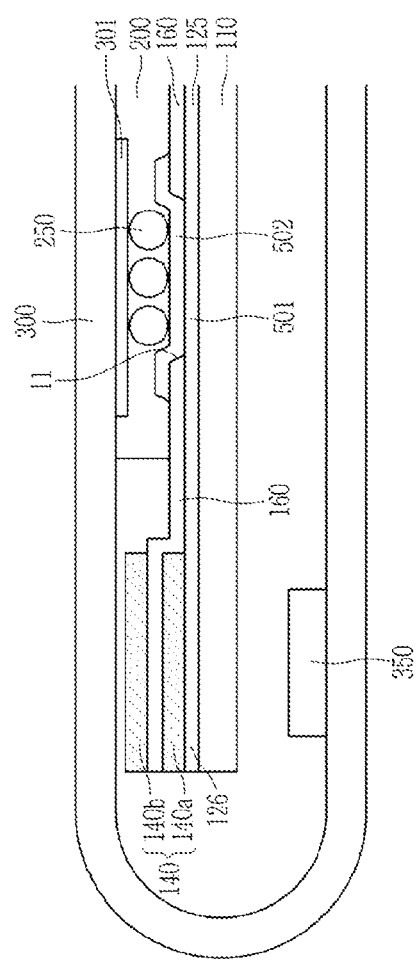
FIG. 9 is a cross-sectional view of a display device according to an exemplary embodiment.

Referring to FIG. 9, a display device according to an exemplary embodiment will now be described. FIG. 9 is a cross-sectional view of a display device according to an exemplary embodiment. Referring to FIG. 9, a display device includes a display panel 100, a flexible printed circuit board 300, and an anisotropically conductive layer 200 that connects the display panel 100 the flexible printed circuit board 300. The display device 100 according to the exemplary embodiment includes an insulation pattern 140 disposed at an edge of the display panel 100, and the insulation pattern 140 includes a first insulation pattern 140a and a second insulation pattern 140b. The first insulation pattern 140a is disposed between an extension wire 126 and a first insulation layer 160, and the second insulation pattern 140b is disposed on the first insulation layer 160. The first insulation pattern 140a and the second insulation pattern 140b may include an organic material, or the first insulation pattern 140a and the second insulation pattern 140b may include different materials.

Figure 10:
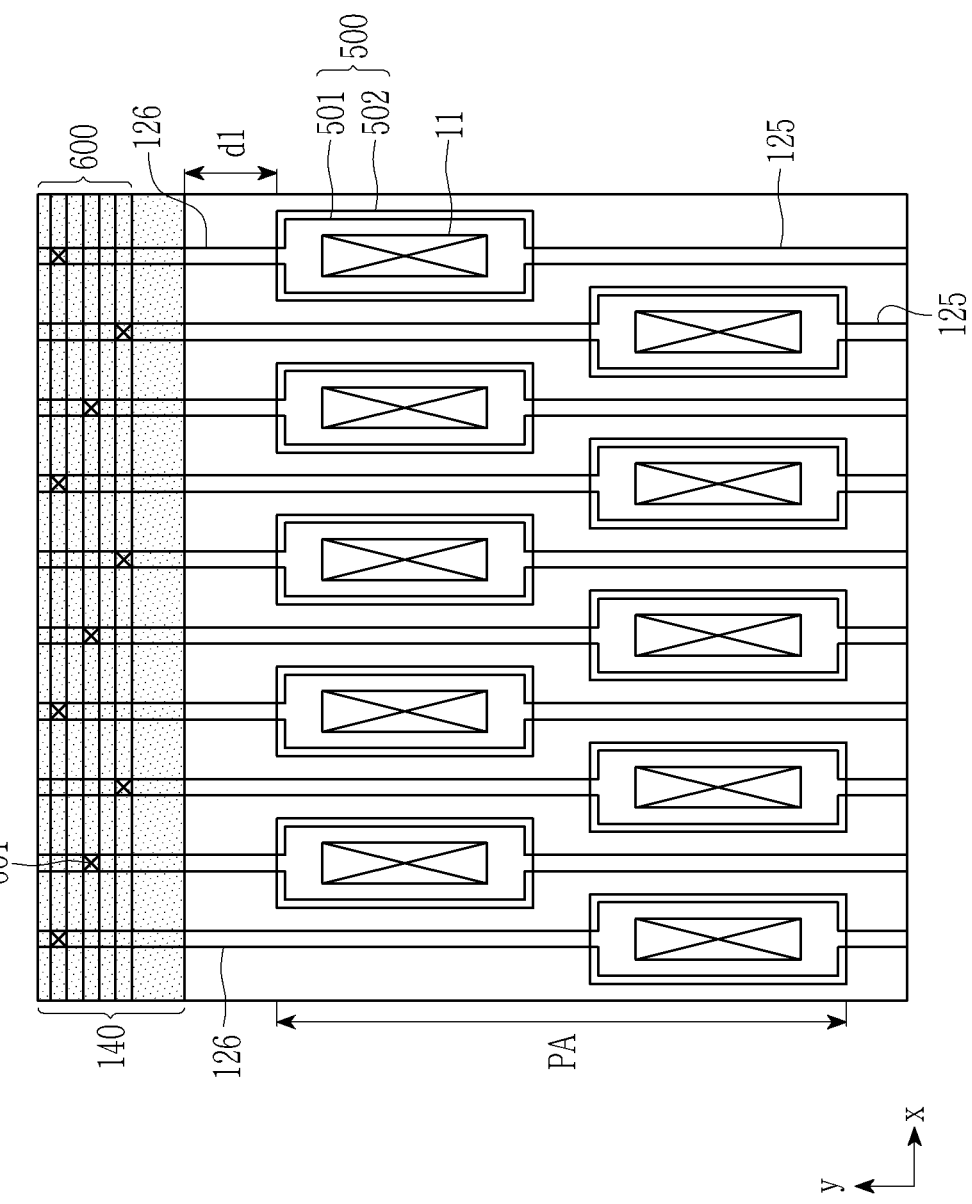
FIG. 10 is an enlarged view of the area A in FIG. 1 in a display device according to an exemplary embodiment.

Referring to FIG. 10, a display device according to an exemplary embodiment will now be described. FIG. 10 is a top plan view of a display device according to an exemplary embodiment. Specifically, FIG. 10 is an enlarged view of the area A in FIG. 1 in a display device according to an exemplary embodiment.

A display device according to an exemplary embodiment includes a test wire 600 disposed at one edge of a display panel 100. The test wire 600 may be provided in plural, and the plurality of test wires 600 may extend substantially in a first direction x from one edge of a substrate and they may be substantially parallel with each other. The plurality of test wires 600 are connected with extension wires 126 extended from data pads 500 through openings 601. The test wire 600 is connected with the extension wire 126 and may transmit a test signal to a data line 171 to test normal operation. The test wire 600 overlaps an insulation pattern 140. Thus, although a flexible printed circuit board 300 is attached to one edge of the display panel 100, the flexible printed circuit board 300 and the test wires 600 of the display panel 100 are insulated from each other by an insulation pattern 140 such that a defect due to a short circuit between the flexible printed circuit board 300 and the test wires 600 of the display panel 100 can be prevented. In FIG. 10, three test wires 600 are shown, but the number of test wires 600 is not limited thereto.

Figure 11:
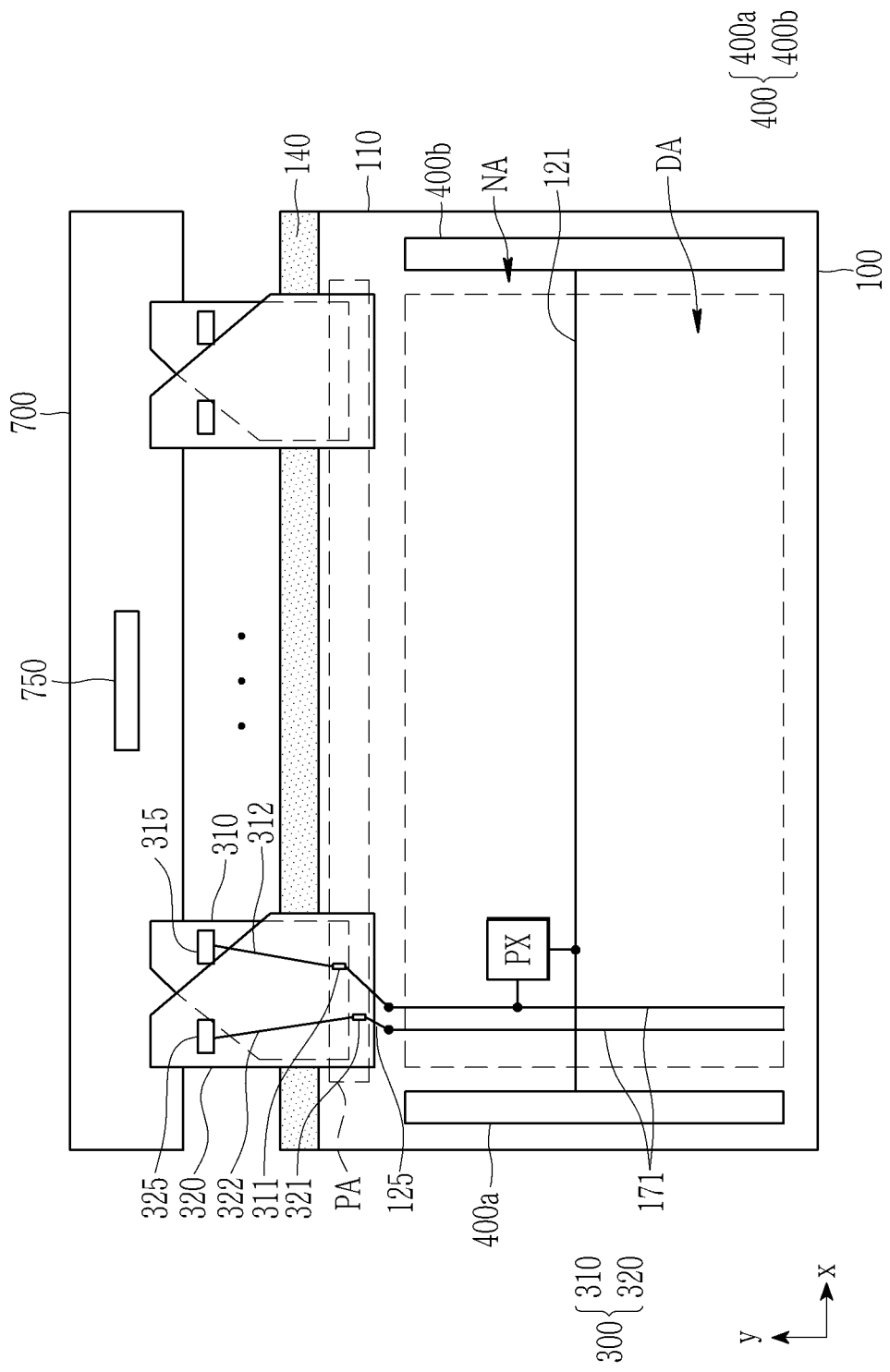
FIG. 11 is a top plan view of a display device according to an exemplary embodiment.
Figure 12:
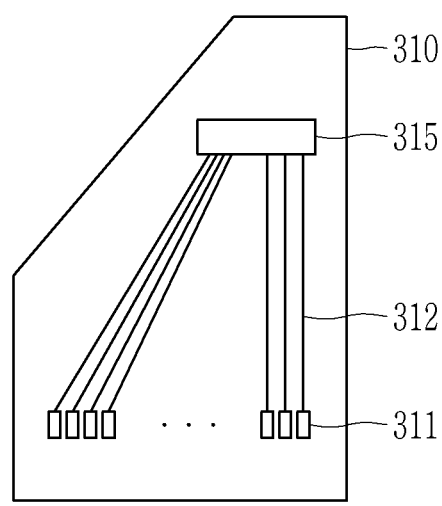
FIG. 12 is a bottom view of a first flexible printed circuit board of FIG. 11.
Figure 13:
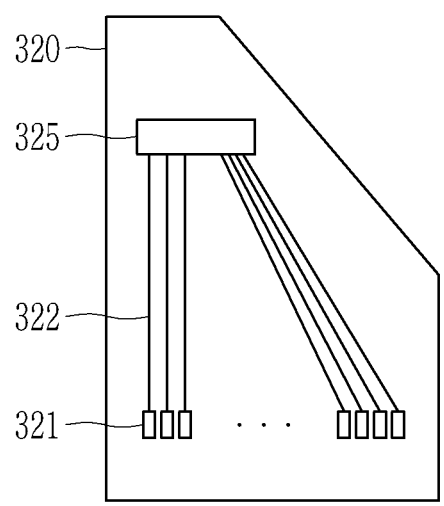
FIG. 13 is a bottom view of a second flexible printed circuit board of FIG. 11.

Hereinafter, a display device according to an exemplary embodiment will be described with reference to FIG. 11 to FIG. 13. FIG. 11 is a top plan view of a display device according to an exemplary embodiment. FIG. 12 is a bottom view of a first flexible printed circuit board of FIG. 11. FIG. 13 is a bottom view of a second flexible printed circuit board of FIG. 11.

Referring to FIG. 11, a display device according to an exemplary embodiment includes a display panel 100, a flexible printed circuit board 300, and flexible printed circuit (FPC) 700.

The flexible printed circuit board 300 includes a first flexible printed circuit board 310 and a second flexible printed circuit board 320. The first flexible printed circuit board 310 and the second flexible printed circuit board 320 are connected with a printed circuit board 700 and the display panel 100. The first flexible printed circuit board 310 and the second flexible printed circuit board 320 overlap each other. When two rows of data pads are disposed in a pad portion PA of the display panel 100, the first flexible printed circuit board 310 may be connected with data pads in the first row of the display panel 100 and the second flexible printed circuit board 320 may be connected with data pads in the second row of the display panel 100. In this case, data pads in the first row mean data pads adjacent to the edge of an insulation pattern 140 and a substrate 110 in the display panel 100 and lined up in a first direction x, and data pads in the second row mean data pads adjacent to a display area DA and lined up in the first direction x in the display panel 100.

Referring to FIG. 12, the first flexible printed circuit board 310 may have a pentagonal shape with one oblique side. However, this is an example, and the first flexible printed circuit board 310 may have any shape.

The first flexible printed circuit board 310 includes a first data driver IC 315 and first data input pads 311. The first data input pads 311 may be arranged in one line. The first data input pads 311 are disposed in areas corresponding to the data pads of the first row in the display panel 100. Thus, the first data input pad 311 disposed in a bottom of the first flexible printed circuit board 310 is connected with the data pad of the display panel 100 such that a data voltage may be transmitted to a data line 171 of the display panel 100.

The first data driver IC 315 may be connected with the first data input pads 311 through wires 312. The first data driver IC 315 receives a data control signal and a digital video signal from a signal controller 750 and generates a data voltage, which is a gray voltage corresponding to each digital video signal. The data voltage generated from the first data driver IC 315 is applied to the corresponding data line 171 of the display panel 100 through the wires 312.

Referring to FIG. 13, the second flexible printed circuit board 320 may have a pentagonal shape with one oblique side. However, this is an example, and the second flexible printed circuit board 320 may have any shape.

The second flexible printed circuit board 320 includes a second data driver IC 325 and second data input pads 321. The second data input pads 321 may be lined up. The second data input pad 321 is disposed in areas corresponding to the data pads of the second row in the display panel 100. Thus, the second data input pads 321 disposed in a bottom of the second flexible printed circuit board 320 are connected with the data pads of the display panel 100 such that the data voltage may be transmitted to the data line 171 of the display panel 100.

The second data driver IC 325 may be connected with the second data input pads 321 through wires 322. The second data driver IC 325 may receive a data control signal and a digital video signal from the signal controller 750 to generate a data voltage, which is a gray voltage corresponding to each digital video signal. The data voltage generated by the second data driver IC 325 is applied to the corresponding data line 171 of the display panel 100 via a wire.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

| | |
|---|---|
| 100: display panel | 110: substrate |
| 121: gate line | 125: data connection wire |
| 126: extension wire | 140: insulation pattern |
| 140a: first insulation pattern | 140b: second insulation pattern |
| 160: insulation layer | 171: data line |
| 200: anisotropically conductive layer | 250: conductive ball |
| 300: flexible printed circuit board | 301: data input pad |
| 310: first flexible printed | 311: first data input pad |

-continued

| | |
|---|---|
| circuit board | |
| 315: first driver IC | 320: second flexible printed circuit board |
| 321: second data input pad | 325: second driver IC |
| 350: driver IC | 400: gate driver |
| 500: data pad | 501: first electrode |
| 502: second electrode | 600: test wire |
| 700: printed circuit board | 750: signal controller |
| DA: display area | NA: non-display area |
| PA: pad portion | |

What is claimed is:

1. A display device comprising:
a display panel; and
a flexible printed circuit board that is connected to the display panel,
wherein the display panel comprises:
a substrate that includes a display area including a plurality of pixels, and a non-display area which is a remaining area of the substrate;
a first conductive layer that is disposed on the substrate;
a first insulation layer that is disposed on the first conductive layer;
an insulation pattern that is disposed along one edge of the display panel and overlaps the flexible printed circuit board; and
a data pad that is disposed between the display area and the insulation pattern.

2. The display device of claim 1, wherein the insulation pattern comprises an organic material.

3. The display device of claim 1, wherein the insulation pattern is disposed on the first insulation layer.

4. The display device of claim 3, wherein the display panel further comprises a data line configured to transmit a data voltage in the display area,
the first conductive layer comprises a data connection wire connected with the data line, a first electrode, and an extension wire,
the first insulation layer comprises an opening exposing the first electrode, and
the data pad comprises a second electrode that is disposed in the opening of the first electrode and the first electrode such that it contacts the first electrode, while overlapping the same.

5. The display device of claim 4, further comprising a test wire that overlaps the insulation pattern.

6. The display device of claim 4, wherein the data pad is arranged in two rows.

7. The display device of claim 6, wherein the flexible printed circuit board comprises a data driver integrated circuit and a data input pad connected with the data driver integrated circuit.

8. The display device of claim 7, further comprising an anisotropically conductive layer that electrically connects the data input pad and the data pad of the display panel while bonding the data input pad and the data pad of the display panel to each other.

9. The display device of claim 6, wherein the flexible printed circuit board comprises a first flexible printed circuit board and a second flexible printed circuit board that overlap each other,
the first flexible printed circuit board comprises a first data driver integrated circuit and a first data input pad connected with the first data driver integrated circuit,
the second flexible printed circuit board comprises a second data driver integrated circuit and a second data input pad connected with the second data driver integrated circuit, and
the first data input pad is connected with data pads in a first row of the data pads in the display panel and the second data input pad is connected with data pads in a second row of the data pads in the display panel.

10. The display device of claim 2, wherein the substrate comprises a first edge and a second edge that face each other, and the insulation pattern extends to the second edge from the first edge.

11. The display device of claim 1, wherein the insulation pattern is disposed below the first insulation layer.

12. The display device of claim 1, wherein the insulation pattern comprises a first insulation pattern and a second insulation pattern that overlap each other, while disposing the first insulation layer therebetween.

13. The display device of claim 12, wherein the first insulation pattern and the second insulation pattern comprise different materials.

14. A display device comprising:
a substrate that includes a display area including a plurality of pixels and a non- display area which is a remaining area of the substrate;
a first conductive layer that is disposed on the substrate;
a first insulation layer that is disposed on the first conductive layer;
an insulation pattern that is disposed in the non-display area;
a data pad that is disposed between the display area and the insulation pattern; and
an extension wire that is connected to the data pad and extends to one edge of the substrate, and
the insulation pattern overlaps the extension wire.

15. The display device of claim 14, wherein the insulation pattern comprises an organic material.

16. The display device of claim 14, wherein the insulation pattern is disposed on the first insulation layer.

17. The display device of claim 14, wherein the insulation pattern is disposed below the first insulation layer.

18. The display device of claim 14, wherein the insulation pattern comprises a first insulation pattern and a second insulation pattern that overlap each other, while disposing the first insulation layer therebetween.

* * * * *